Feb. 2, 1932.  G. D. SUNDSTRAND  1,843,345
CONTINUOUS MILLING MACHINE
Filed July 12, 1929

Inventor:
G. D. Sundstrand,

Patented Feb. 2, 1932

1,843,345

UNITED STATES PATENT OFFICE

GUSTAF DAVID SUNDSTRAND, OF ROCKFORD, ILLINOIS, ASSIGNOR TO SUNDSTRAND MACHINE TOOL COMPANY, OF ROCKFORD, ILLINOIS, A CORPORATION OF ILLINOIS

CONTINUOUS MILLING MACHINE

Application filed July 12, 1929. Serial No. 377,884.

Continuous milling machines are used for the production of duplicate work pieces, and embody a plurality of work holders mounted on one or more movable supports so as to be moved successively into operative relation with the same cutter or with one of a plurality of cutters so that during the performance of the cutting operation on a work piece in one work holder, another work holder may be unclamped and the finished work piece removed and replaced by a new piece.

In such machines the movement of the work support or supports is controlled by suitable trip devices which cause the support or supports to move through a constantly recurring operating cycle, the movements of the cycle, of course, being dependent upon the class of work and the type of continuous miller used. The present invention relates to the type of continuous milling machines in which the feeding movement of the work support constitutes a continuation of the approach movement thereof, the most common type of such machines having a longitudinally reciprocable table with work holders mounted thereon in longitudinally spaced relation so that a work piece may be milled each time the direction of movement of the table is changed.

In machines of this character heretofore used, the cutting means has been positioned intermediate the two spaced work holders so that upon reciprocation of the table through a stroke of definite length, the holders are brought alternately into operative relation with the cutting means. Various arrangements of cutters have been employed, some machines having two oppositely disposed cutters fixed on a single arbor in axially spaced relation together with means for reversing the direction of rotation of the arbor in accordance with the direction of movement of the table so that the cutting operation may be performed in a similar manner on work pieces secured in either work holder.

Other machines of this type have employed two cutter arbors mounted in horizontally spaced relation between the two work holders so that each arbor might be continuously rotated.

In the use of a machine having either of these two arrangements of cutters, the operator loads one of the holders while it is positioned remotely from the cutting means and after it has been loaded and the cutting operation completed on the work in the other holder, the table movement is reversed so that the completed work is moved away from the cutting means and the new work moved into operative relation thereto. The operator may then remove the completed work from its holder, but it will be seen that in order to do this he must walk along the table for a distance equal to the distance between the two holders plus the length of the stroke of the table.

In order to give the operator time to move from one loading position to the other it has been necessary in the prior art machines to make the total time between loading periods longer than would otherwise be necessary. Furthermore, the continual movement back and forth from one loading position to the other has resulted in undue fatigue of the operator.

The present invention has for its primary object the provision of an improved continuous milling machine of this type constructed so that the operator may load all of the work holders from the same position whereby to avoid loss of time in walking from one position to another and to avoid undue fatigue on the part of the operator so that a high rate of production may be maintained throughout the day.

Another object is to provide such a milling machine having a pair of driven cutter spindles mounted in spaced relation with a movable support carrying a pair of work holders each adapted for cooperation with one of the cutters, the support being adapted by movement through a given stroke in opposite directions to move the work holders alternately into operative relation with their respective cutters and during such movement to move the holder carrying the finished work piece to a point where it will be within easy reach of an operator stationed at a point equidistant from the cutters.

Another object is to provide such a machine having horizontally spaced cutters with a work table reciprocable transversely thereof together with a pair of work holders mounted on the table between the two cutters so that the holders are brought alternately into operative relation with the adjacent sides of the cutters by reciprocatory movement of the table.

Other objects and advantages will become apparent from the following description taken in connection with the accompanying drawings, in which.

Figure 1:
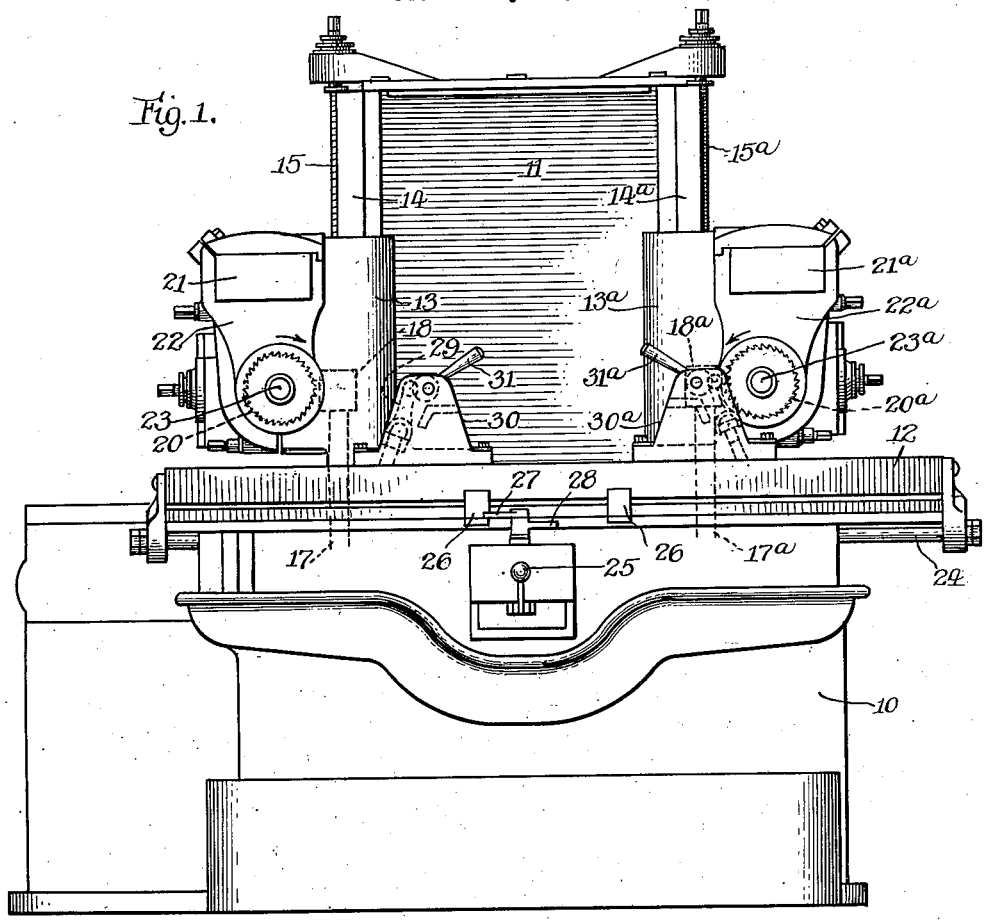
Figure 1 is a front elevational view of a milling machine embodying the preferred form of the invention.

For purposes of disclosure the invention is herein illustrated and hereinafter described in detail as applied to a machine having horizontally spaced cutters rotatable about horizontal axes and cooperating with work holders mounted on a single support arranged for movement back and forth along a rectilinear path, but it is to be understood that this disclosure is not to be taken as a limitation of the invention to the particular construction and arrangement shown, it being contemplated that various changes may be made by those skilled in the art without departing from the spirit and scope of the appended claims.

In the form shown, the invention is embodied in a milling machine having a bed 10 with a comparatively wide column 11 upstanding from the rear portion thereof and having a movable work support in the form of a table 12 reciprocable transversely of the bed 10 in front of the column. On opposite sides of the column 11 a pair of spindle heads 13, 13ª, are mounted arranged for vertical adjustment on ways 14, 14ª by means of screws 15, 15ª. The heads 13 and 13ª carry rotatably mounted spindles (not shown) positioned transversely with respect to the path of movement of the table 12 and driven by means including a pair of splined shafts 17, 17ª projecting upwardly from the bed 10 and operatively connected to the spindles within the heads by means of gears 18, 18ª.

For the purpose of supporting a pair of milling cutters 20, 20ª over the table 12, a pair of overarms 21, 21ª are mounted in the heads 13, 13ª respectively so as to project over the table parallel to and above the spindles and carrying pendants 22, 22ª at their outer ends. The cutter 20 is fixed on an arbor 23, the inner end of which is supported and driven by the spindle (not shown) in the head 13 while the outer end is supported by the pendant 22. The cutter 20ª is similarly fixed on an arbor 23ª which is similarly supported by the pendant 22ª and the spindle (not shown) in the head 13ª.

In the present embodiment the table 12 is moved back and forth along its path at feed or rapid traverse speeds in either direction by means of an hydraulic actuating mechanism of a conventional character which includes a double acting piston and cylinder device (not shown) mounted within the bed and connected to opposite ends of the table 12 by a piston rod 24, but it will be understood that the table may be reciprocated by various other forms of driving means. The actuating mechanism is controlled manually by a control handle 25 positioned on the bed of the machine forwardly of the table and midway between the two spindles.

The movement of the table may also be controlled automatically by means of a well-known character including suitable dogs 26 secured on the forward edge of the table and arranged during movement of the table to engage trip devices 27 and 28 to change the speed and/or direction of movement of the table.

For the purpose of supporting work pieces 29 for operative engagement with the cutters 20, 20ª a pair of work holders 30, 30ª are mounted on the table 12 at positions spaced longitudinally thereof, and in order that the holders may be loaded with the minimum amount of effort and to save operating time, the holders are spaced at a distance less than the distance between the cutters and are fixed on the table so as normally to be between the spindles. Thus upon reciprocation of the table over a definite stroke, the work holders will be brought alternately into cooperating relation with the adjacent cutter and it will be noted that each work holder always cooperates with the same cutter and during the performance of a cutting operation on a work piece in one holder, the other holder will be positioned remotely from its cutter so that the operator may unclamp the work carried by the second holder and clamp a new piece in position by means of the handle 31 or 31ª. It will be understood that the form and dimensions of the work holders will vary with the character of the work pieces.

It will be readily seen that when one holder is moved into operative relation to its cutter, the other holder will be moved away from its cutter and toward the transverse center line of the machine and within easy reach of an operator standing in front of the manual control handle 25 so that he may replace the work in both holders without moving from his position.

Figure 2:
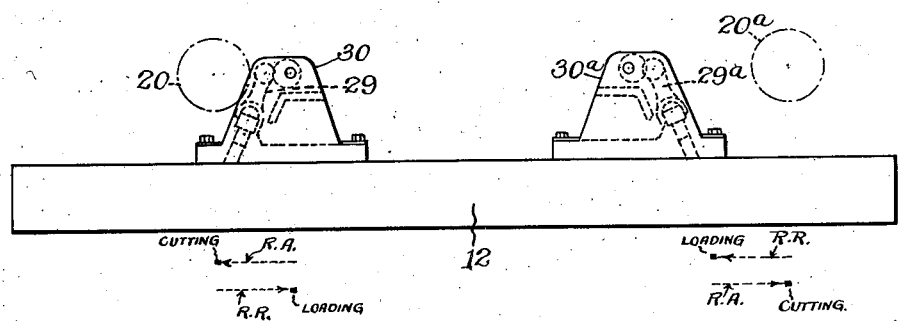
Fig. 2 is a diagrammatic view illustrating the preferred operating cycle employed in the machine.

In the use of the machine the dogs 26 are set so that the table is given a recurrent cycle of movement in opposite directions, as indicated diagrammatically in Fig. 2, the first part of the movement in each direction being at rapid traverse speed and the last part in the same direction being at feeding speed.

Thus after completion of a cutting operation, upon a work piece clamped in the holder 30 as shown in Fig. 2, the movement of the table 12 is reversed and the table is moved to the right at rapid traverse speed, this particular movement constituting a rapid return movement (indicated as "R. R." in Fig. 2) for the finished work piece in the holder 30, and constituting a rapid approach movement (indicated as "R. A." in Fig. 2) for the new work piece clamped in the holder 30ª. When the holder 30ª has advanced nearly to the cutter 20ª, the rate of movement of the table 12 is changed to feeding speed so that subsequent movement of the table to the right constitutes a cutting movement for the holder 30ª and provides a period during which the holder 30 may be reloaded. When the milling of the piece is completed, the table is reversed and the operation repeated in the opposite direction.

From the foregoing it will be apparent that the invention provides a continuous milling machine with which an extremely high rate of production may be obtained since the operator may always remain in the same position adjacent the manual control handle and from this position may load all of the work holders. By reason of the reduced amount of effort required of the operator, his efficiency will be increased so that the high rate of production may be maintained throughout the entire working day.

I claim as my invention:—

1. A continuous milling machine comprising, in combination, a bed, a work table reciprocable on said bed, a pair of cutter spindles extending transversely of said table, a cutter connected to each spindle, means for rotating said spindles, said spindles being spaced longitudinally of the path of movement of said table, and a pair of work holders mounted on said table at points spaced longitudinally of said path, the distance between said spindles being greater than the distance between said work holders.

2. A continuous milling machine comprising, in combination, a pair of driven cutter spindles spaced horizontally from each other, a cutter connected to each spindle, a movable work support, a pair of work holders mounted on said support and spaced from each other along the path of movement of said support, each of said holders being adapted to cooperate with one of said cutters, said work holders being positioned on said support so that one of said holders is brought into operative relation with its cutter at the end of a given movement of the support in one direction, the other holder is brought into operative relation with its cutter at the end of a corresponding movement of the support in the opposite direction, the position of the work holders also being such that when one of the work holders is in operative relation to its cutter the other work holder will be within easy reach of an operator stationed at a point equidistant from said cutters.

In testimony whereof, I have hereunto affixed my signature.

GUSTAF DAVID SUNDSTRAND.